US009424860B2

(12) United States Patent
Hetherington

(10) Patent No.: US 9,424,860 B2
(45) **Date of Patent: *Aug. 23, 2016**

(54) MIXER WITH ADAPTIVE POST-FILTERING

(71) Applicant: 2236008 Ontario Inc., Waterloo (CA)

(72) Inventor: Phillip A. Hetherington, Port Moody (CA)

(73) Assignee: 2236008 Ontario Inc., Waterloo (CA)

( * ) Notice: Subject to any disclaimer, the term of this patent is extended or adjusted under 35 U.S.C. 154(b) by 256 days.

This patent is subject to a terminal disclaimer.

(21) Appl. No.: 13/924,139

(22) Filed: Jun. 21, 2013

(65) Prior Publication Data

US 2013/0279718 A1 Oct. 24, 2013

Related U.S. Application Data

(63) Continuation of application No. 13/331,753, filed on Dec. 20, 2011, now Pat. No. 8,494,179, which is a continuation of application No. 12/264,791, filed on Nov. 4, 2008, now Pat. No. 8,121,311.

(60) Provisional application No. 60/985,557, filed on Nov. 5, 2007.

(51) Int. Cl.

| | |
|---|---|
| ***H04B 15/00*** | (2006.01) |
| ***G10L 21/0208*** | (2013.01) |
| ***G10L 21/02*** | (2013.01) |
| ***G10K 11/16*** | (2006.01) |
| *G10L 21/0216* | (2013.01) |
| *H04R 3/00* | (2006.01) |
| *G10L 19/26* | (2013.01) |

(52) U.S. Cl.

CPC ............ *G10L 21/0208* (2013.01); *G10K 11/16* (2013.01); *G10L 21/02* (2013.01); *G10L 19/26* (2013.01); *G10L 2021/02165* (2013.01); *H04R 3/005* (2013.01)

(58) Field of Classification Search

CPC ................. G10L 21/0208; G10L 2021/02165; H04R 3/005

USPC ................... 381/94.1–94.7, 92; 704/226, 233

See application file for complete search history.

(56) References Cited

U.S. PATENT DOCUMENTS

| | | | | |
|---|---|---|---|---|
| 5,602,962 A * | 2/1997 | Kellermann | H04R 1/406 | 381/92 |
| 6,473,733 B1 * | 10/2002 | McArthur | G10L 21/0208 | 704/200.1 |
| 7,672,466 B2 * | 3/2010 | Yamada | G10H 1/361 | 379/406.01 |
| 8,000,482 B2 * | 8/2011 | Lambert | H04R 3/005 | 381/94.1 |
| 2005/0213778 A1 * | 9/2005 | Buck | H04R 3/005 | 381/94.3 |
| 2008/0140396 A1 * | 6/2008 | Grosse-Schulte | G10L 15/20 | 704/227 |

* cited by examiner

*Primary Examiner* — Disler Paul

(74) *Attorney, Agent, or Firm* — Brinks Gilson & Lione

(57) ABSTRACT

A noise reduction system includes multiple transducers that generate time domain signals. A transforming device transforms the time domain signals into frequency domain signals. A signal mixing device mixes the frequency domain signals according to a mixing ratio. Frequency domain signals are rotated in phase to generate phase rotated signals. A post-processing device attenuates portions of the output based on coherence levels of the signals.

26 Claims, 4 Drawing Sheets

MIXER WITH ADAPTIVE POST-FILTERING

PRIORITY CLAIM

This application is a continuation of U.S. Non-Provisional application Ser. No. 13/331,753, filed Dec. 20, 2011 (now U.S. Pat. No. 8,494,179), which is a continuation of U.S. Non-Provisional application Ser. No. 12/264,791, filed Nov. 4, 2008 (now U.S. Pat. No. 8,121,311), which claims the benefit of U.S. Provisional Application No. 60/985,557, filed Nov. 5, 2007. The contents of U.S. Non-Provisional application Ser. No. 13/331,753 (now U.S. Pat. No. 8,494,179), U.S. Non-Provisional application Ser. No. 12/264,791 (now U.S. Pat. No. 8,121,311), and U.S. Provisional Application No. 60/985,557 are hereby incorporated by reference in their entirety.

BACKGROUND OF THE INVENTION

1. Technical Field

This disclosure relates to signal processing, and in particular to systems that attenuate unwanted or undesired signals that may lower the quality of a communication channel.

2. Related Art

Noise may affect the quality or performance of a communication channel. Noise may conceal information and may cause undesirable changes in a waveform or a signal. The noise may occur naturally or by the processes that convey signals.

Some systems attempt to selectively isolate a speaker to eliminate or minimize noise. When multiple speakers engage in a conversation, this form of separation may not effectively minimize noise. The system may not reduce noise or improve signal-to-noise ratios.

SUMMARY

A noise reduction system includes two or more transducers that generate time domain output. A transforming device transforms the time domain output into the frequency domain. A signal mixing device mixes the frequency domain signals based on a magnitude and a signal-to-noise ratio. The mixing device may rotate frequency domain signals. The rotated signals may be added based on a mixing ratio. A post-processing device may attenuate portions of the combined signals based on coherence levels.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the inventions. Moreover, in the figures, like-referenced numerals designate corresponding parts throughout the different views.

DETAILED DESCRIPTION OF THE PREFERRED EMBODIMENTS

Systems reduce noise and improve the signal-to-noise ratio of signals conveyed through one or more communication channels. The systems may dampen unwanted perceptible and/or imperceptible signals to the mind or senses that occur naturally or are generated by or near the processing technology. Some systems support two, three, or more inputs and may combine and adjust the sounds that originate from many sources into one or more signals that may be conveyed through a common or single channel. The systems maintain voice quality and may reduce and diffuse noise automatically to programmable levels.

Figure 1:
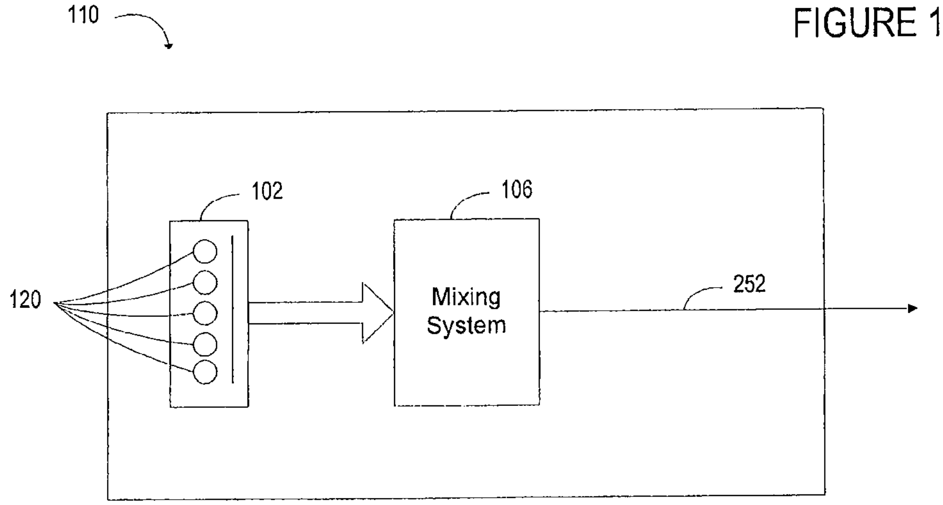
FIG. 1 is an input and mixing system that may interface or may be part of a vehicle.
Figure 2:
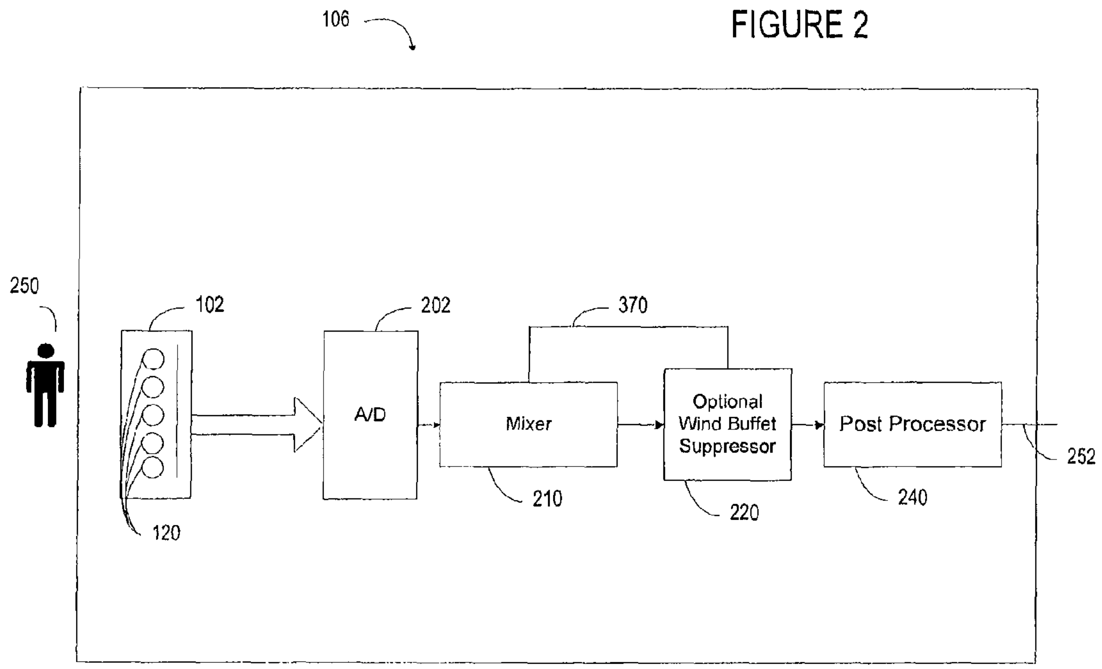
FIG. 2 is an exemplary mixing system.

FIG. 1 shows a number of inputs 120 that may operate in tandem. While shown in a linear array, the inputs 120 may be distributed about a space such as a perimeter that may be linked to a mixing system 106. In FIGS. 1 and 2 the mixing system 106 may comprise a microphone mixing system and the inputs 120 may comprise one, two, or more devices, transducers, or microphones that convert sound into analog or digital signals. In some systems the microphones, arrays 102 (e.g., one is shown), or inputs are positioned in line with a voice of interest ("end-fire"), in alternative systems the microphones, arrays, or inputs, are positioned substantially perpendicular to the voice of interest ("broad-side"), and in other alternative systems, the microphones, arrays, or inputs are distributed in end-fire and broad-side configurations. The arrays 102 may be made up of omnidirectional inputs or microphones, directional inputs or microphones, or a combination of one or more end-fire and broad-side inputs where groups or multiples of microphones may comprise a virtual microphone.

In some systems the inputs 120 are enclosed by a single or common housing, in alternative systems, the inputs are located in separate housings. The inputs 120 (or microphones) may be directionally splayed to receive two or more targets that may be in an open space or surrounded by an enclosure. When enclosed within a vehicle 110 (optional), the inputs may target a driver, a passenger, and/or a co-driver. The inputs 120 may be positioned substantially in parallel and may receive sound from a common or a similar direction. In some systems, noise suppressor and filters customized to an input or direction may reduce the noise detected from each array 102 or microphone configuration.

The mixing system 106 may reduce noise detected or processed by one or more arrays 102. A signal-to-noise level may be improved when a signal of interest, such as a speech signal, is received by two or more inputs 120 at different times. A voice signal originating from a source, such as a speaker, may be received by a first input 120 at an initial time, and received by a second, more distant input 120, later in time. In some systems, the propagation delay may be predictable and substantially constant.

If a first input receives a voice signal about one millisecond before a second input, one or both of the signals may be delayed and summed, and the two signals may add constructively. If the amplitude of each signal is about equal, the resulting signal may be about twice the amplitude of either individual signal which may represent a gain of about 6 dB.

Ambient or diffused noise may be received by the inputs 120 from different directions and at different times. If a noise signal is processed, the amplitudes may add constructively in some situations, and may add destructively in other situations. The result may dampen the noise. In some systems the noise signal may have an amplitude of about 1.41 (square root of 2) times the amplitude of the original signal, which may represent a gain in signal-to-noise of about 3 dB.

FIG. 2 is an exemplary mixing system 106. The mixing system 106 may include an input array 102 having a plurality of inputs 120 (e.g., microphones). The inputs 120 may convert sound into digital data streams that one or more signal processors or computers may process. Alternative inputs 120 may generate continuously varying (analog) signals. One or more optional devices 202 (e.g., analog-to-digital converters) may convert the continuously varying signals into digital data streams. A mixing device 210 may adjust and combine the multiple data streams into one or more composite signals that may be processed by an optional wind buffet suppression logic or circuit 220. The wind buffet suppression logic or circuit 220 may automatically monitor, learn, and encode the shape and form of wind noises (e.g., air flow) in real or a delayed time.

By tracking selected attributes of the wind noise, the optional wind buffet suppression logic or circuit 220 may eliminate or dampen wind noise. The optional wind buffet suppression logic or circuit 220 may access a local or distributed memory that may store the selected attributes of the wind noise. In some mixing systems 106, the optional wind buffet suppression logic or circuitry 220 may interface or include an automatic control mechanism or device that measures wind noise and returns a portion of the output through a feedback loop 370. The feedback loop 370 may convey one or more signals that may be used to modify or control a mixing ratio. An optional post filter 240 may suppress noise by passing portion of the composite signal(s) that are a product of a coherent combination while blocking or dampening other portions of signals that have a low signal-to-noise ratio or low coherence. In FIG. 2, the mixing system 106 may maximize the signal-to-noise ratio of one or more signals of interest, such as a signal from a driver or passenger, by automatically selecting, and in some systems, adapting an optimum phase and amplitude mixing ratios, and by reducing portions of the signal that may lack coherence across multiple inputs 120 (e.g., two or more).

In an acoustic environment, such as a vehicle 110, a mixing system may receive input from many sources 250 including the driver and passengers. The mixing system 106 may reduce or dampen the noise level that surrounds speech by increasing the signal-to-noise level of speech signals. In some systems the increase in signal quality occurs without knowledge of the source 250 or the input. The mixing system 106 may adjust and combine the signals processed by the inputs 120.

Figure 3:
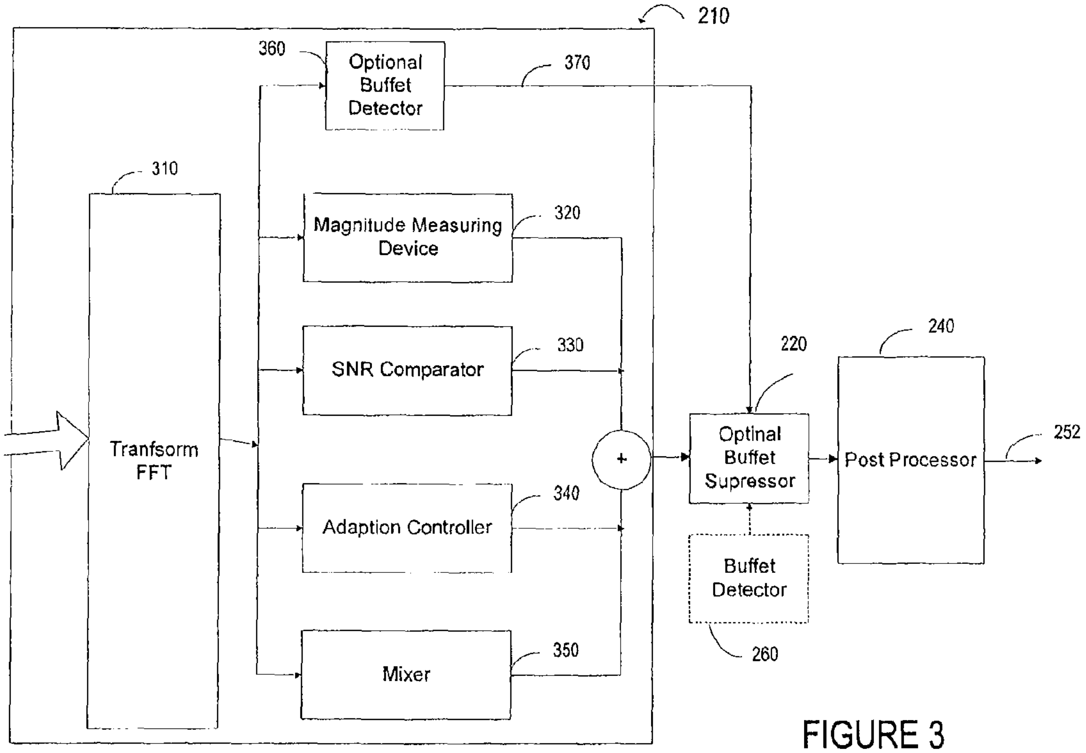
FIG. 3 is a second exemplary mixing device.

FIG. 3 is an exemplary mixing device or circuit 210. The mixing device 210 may include a domain transforming device or circuit 310, a signal magnitude calculation device 320, a signal-to-noise comparison device 330, an adaptation control device 340, a mixing control device 350, and an optional wind buffet detection device 360. The domain transforming device 310 may receive digitized samples from an optional analog-to-digital converter 202 that may process multiple inputs 120 that may be arranged in one or more arrays 102. The system may process more than two inputs.

A first input signal (a digitized signal) may correspond to speech captured by a driver-oriented input, while a second input signal (a digitized signal) may correspond to the speech captured by a second driver-oriented input. The domain transforming device 310, which may comprise a Fast Fourier Transform (FFT) device, or which may apply an FFT process, may transform the first and second input signals from the time domain to the frequency domain. Each frequency bin i may be represented by a complex variable having a real ($Re_i$) component and an imaginary ($Im_i$) component.

A signal magnitude calculation or estimating device 320 may estimate a magnitude value for each frequency bin by deriving a magnitude of the hypotenuse of the real and imaginary components, as described in Equation 1:

$$M_i\sqrt{Re_i^2+Im_i^2} \qquad \text{(Equation 1)}$$

To reduce complexity, the magnitude may be approximated by a weighted sum of the absolute values, as described in Equation 2:

$$M_i\omega\times(|Re_i|+|Im_i|) \qquad \text{(Equation 2)}$$

The signal-to-noise comparison device 330 may compare the derived magnitudes to a noise estimate. The noise estimate may be estimated for each signal. To reduce processing complexity, the magnitude of each channel may be compared to a post-mix single-channel noise estimate through a comparator, based on an expected gain from the mixing device 210 and the post-processing device 240. The mixing device 210 may improve the signal-to-noise ratio by a programmable or fixed amount (e.g., about 3 dB), and the post-processing device 240 may programmed to another or similar programmable or fixed amount (e.g., may be set to about a 6 dB attenuation level). At these exemplary levels, the signal-to-noise level may be determined by Equation 3:

$$SNR_i=S_i-N_i-9\text{ dB} \qquad \text{(Equation 3)}$$

where $S_i$ may be the signal magnitude at frequency i, in units of dB, and where $N_i$ may be the noise estimate at frequency i in units of dB. The signal-to-noise comparison device 330 may derive or estimate the signal-to-noise ratio for both the first and the second input signals. The maximum of the two values may be selected as the signal-to-noise level for an incoming signal. The adaptation control device 340 may adapt the mixing device 210 based on each bin, where each bin may have a corresponding signal-to-noise ratio greater than a predetermined threshold value, for example, about 10 dB to about 14 dB. The adaptation control device 340 may provide an indication to the mixing device 210 when the signal level is above the noise level.

The adaptation control device 340 may adjust its adaptation rate based on the phase of the input signals. The device 340 may generate a phase difference ($\delta\phi_i$) between the complex components of the left and right input signals at each frequency, based on Equation 4:

$$\delta\phi_i=L\phi_i-R\phi_i \qquad \text{(Equation 4)}$$

The phase may comprise the arctan of the complex components or an approximation of the arctan trigonometric function shown in Equation 5:

$$\phi_i=\tan^{-1}(Im_i/Re_i) \qquad \text{(Equation 5)}$$

The phase difference of Equations 4 or 5 may be stored in a local or distributed (e.g., remote) memory, and may be processed to align a phase of one channel with the phase of another channel across a frequency band. In some systems, the instantaneous phase difference may be used. In these systems, the phase difference may not have been smoothed.

During adaptation, the mixing control device 350 may generate a mixing ratio of the magnitude of left channel signal to the right channel signal. A mixing ratio ($\omega_i$) may ensure optimal mixing given by Equation 6:

$$\omega_i=\frac{L_i}{L_i+R_i}, \qquad \text{(Equation 6)}$$

In FIG. 6, $L_i$ may be the estimated or actual magnitude of the first or left channel signal at a frequency i, where $R_i$ may be the estimated or actual magnitude of the second or right channel signal at the frequency i, and where $\omega_i$ may be the contribution of the first or left channel signal to be added. The contribution of the second or right channel may be given by Equation 7:

$$1-\omega_i \quad \text{(Equation 7)}$$

If the first and second channel signals have about equal amplitudes, the mixing values may be about 0.5. If the first channel signal is equal to about 0, the mixing values may be about 0 and about 1.0, respectively. If the second channel signal is equal to about 0, the mixing values may be about 1.0 and about 0, respectively.

The mixing ratio may be smoothed in time using an infinite impulse response (IIR) filter or process given by Equation 8:

$$\omega'_i=\omega'_i+\alpha(\omega_i-\omega'_i) \quad \text{(Equation 8)}$$

In Equation 8, $\omega_i$ may be the instantaneous mixing ratio, where $\omega'_i$ may be the time smoothed ratio, and where $\alpha$ may be set to a fixed value, which may range from about 0.05 to about 0.25, and may depend on how fast a beam switches.

In alternative systems, the magnitudes at each bin for both the first and the second channel signals may be smoothed. The mixing ratio may be based on smoothed magnitude vectors to improve stability.

The mixing control device 350 may mix the first and second channel signals on a frame-by-frame basis by rotating one channel in phase with the other channel. This process may correspond to a time delay in the time domain. The mixing control device 350 may add the rotated signals according to a mixing ratio. In some applications, such as when the mixing system 106 is used within a vehicle 110, planar propagation of source waveforms (the input signal) are not assumed due to the nature of the enclosed space, proximity of hard reflecting surfaces, or the acoustic dynamics corresponding to the input housing.

In some applications, the signals may experience different time delays at different frequencies, and may have different amplitude ratios at different frequencies. For example, at 2,000 Hz a first channel signal may be 6 dB greater than a second channel signal, but at 2100 Hz the reverse may be true. In these applications, each frequency or bin may be processed independently.

There may be periods when there is no signal component on a channel at a given frequency. In some circumstances, the signal may be masked by noise. The lower amplitude signal (or lower signal-to-noise ratio) may be rotated in phase with the higher amplitude signal (or higher signal-to-noise ratio). Rotation may occur independently at each frequency or frequency bin. For each frame, each frequency bin, the lower amplitude signal (or lower signal-to-noise ratio) channel may be rotated in line with the higher amplitude signal (or higher signal-to-noise ratio) channel. If the right channel signal is greater than the left channel signal, the corresponding rotated left channel value may be expressed by Equations 9 and 10:

$$L\,Re'_i=L\,Re_i\times\cos(\phi)+L\,Im_i\times\sin(\phi) \quad \text{(Equation 9)}$$

$$L\,Im'_i=L\,Im_i\times\cos(\phi)-L\,Re_i\times\sin(\phi) \quad \text{(Equation 10)}$$

If the left channel signal is greater than the right channel signal, the corresponding rotated right channel value may be expressed by Equations 11 and 12:

$$R\,Re'_i=R\,Re_i\times\cos(\phi)-R\,Im_i\times\sin(\phi) \quad \text{(Equation 11)}$$

$$R\,Im'_i=R\,Im_i\times\cos(\phi)+R\,Re_i\times\sin(\phi) \quad \text{(Equation 12)}$$

The mixing control device 350 may mix the rotated channels in accordance with a smooth mixing ratio to generate the complex values expressed by Equations 13 and 14:

$$M\,Re_i=\omega_i\times R\,Re_i+(1-\omega_i)\times L\,Re_i \quad \text{(Equation 13)}$$

$$M\,Im_i=\omega_i\times R\,Im_i+(1-\omega_i)\times L\,Im_i \quad \text{(Equation 14)}$$

The adaptation and mixing process may improve the signal-to-noise ratio and generate a higher signal-to-noise ratio than some systems that splay signals that have different amplitudes. In systems using splayed inputs, the amplitude of the output may degrade depending on the location of a primary source. In some systems, this loss may be compensated for by multiplying the output by a predetermined constant.

The mixing device 210 may include an optional wind buffet detection device 360. The wind detection device 360 may identify noises associated with wind flow from the properties of air. While wind noise occurs naturally or may be artificially generated over a broad frequency range, the wind buffet detection device 360 is configured to analyze and detect the occurrence of wind noise, and in some instances, the presence of a continuous underlying noise. When wind noise is detected, the spectrum may be identified and selected attributes or associated control data may be retained in a local or distributed memory. To overcome the effects of wind noise, and in some instances, the underlying continuous noise that may include ambient noise, an optional buffest suppression device 220 may substantially remove or dampen the wind noise and/or the continuous noise from the unvoiced and mixed voice signals. In some systems, the optional wind buffet detection device 360 and optional buffet suppression device 220 may be part of the mixing device 210.

In systems that include wind buffet detection, speech may be detected at the inputs 120 at about equal amplitudes. Because wind may not be an acoustic phenomenon, it may be selectively received by the inputs 120, which may result in a large, low frequency artifact on one input at a time. To reduce or substantially eliminate the effects of wind buffets, the mixing device 210 may select or derive a mixing ratio that minimizes its inclusion in the combined signal.

In some systems, the mixing device 210 may select a lower amplitude channel signal at a given bin for frequencies below a predetermined frequency. The predetermined frequency may be, for example, about 600 Hz. This binary selector may be smoothly averaged with the longer term mixing ratio, which may provide a mixing ratio that acts quickly at low frequencies to select the lower amplitude channel signal and in medium to higher frequencies, to optimize for a higher signal-to-noise ratio signals. The wind buffet reduction device 220 or process may be used when the speech signal has about equal amplitudes on each of the signal channels at the low frequencies.

Figure 4:
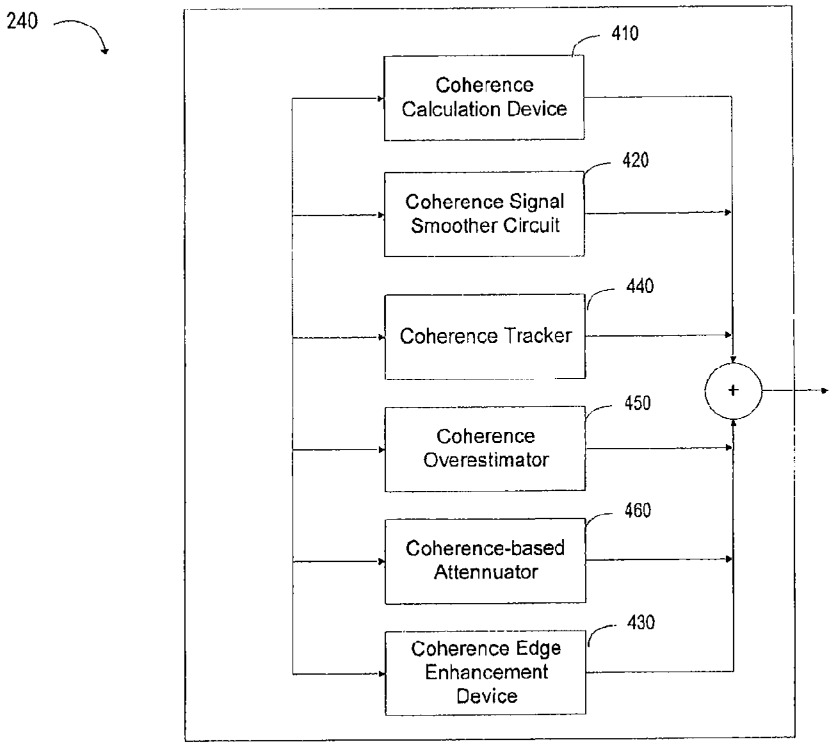
FIG. 4 is an exemplary post-processing device.

FIG. 4 is the post-processing device 240. The post-processing device 240 may include a coherence calculating device 410, a coherence signal smoothing device 420, a coherence edge enhancement device 430, a coherence tracking device 440, a coherence over-estimation device 450, and a coherence-based attenuation device 460. The coherence calculating device 410 may estimate or derive a spectral coherence or "magnitude squared coherence" (MSC), which may be a ratio of the magnitude squared cross power spectral density, $P_{xy_i}$ to the product of the power spectral densities ($P_{x_i}\times P_{y_i}$) of the input signals given by Equation 15:

$$C_{xy_i} = \frac{P^2_{xy_i}}{P_{xi} \times P_{y_i}} \quad \text{(Equation 15)}$$

The cross power spectral densities and the power spectral densities may be summed over a short time period, otherwise the value of $C_{xy_i}$ may become equal to about 1. Such vectors may be temporally smoothed using IIR filters or devices given by Equation 16:

$$P'_{xy_i}=P'_{xy_i}+\alpha(P_{xy_i}-P'_{xy_i}),$$

$$P'_{x_i}=P'_{x_i}+\alpha(P_{x_i}-P'_{x_i}),$$

$$P'_{y_i}=P'_{y_i}+\alpha(P_{y_i}-P'_{y_i}) \quad \text{(Equation 16)}$$

The $\alpha$ range may permit fast recognition of good coherence, but may not show high coherence long after speech occurs. A single value may range from about 0.05 to about 0.3. The IIR filter or process may adapt asymmetrically by using a smaller value for onsets, and larger values for offsets. When the power at a given time and frequency is greater than the power of a last or previous frame (onset), $\alpha$ may be set to a low value, such as about 0.03. When the power at a given time and frequency is lower than the power of the last or previous frame (offset), $\alpha$ may be set to a high value, such as about 0.25. The $\alpha$ value may minimize the measured coherence in noise before and immediately after a coherent signal has been detected. The post-processing device 240 may permit a coherent signal to pass through, while suppressing or partially suppressing portions of a signal not coherent. The amount of suppression may be a predetermined or user-determined amount, such as between about 3 dB and about 8 dB.

The mixing system 106 may interface or may be a unitary part of another system, such as an echo-cancellation system. Echo-cancellation may occur before or after a signal is processed by the mixing device 210. If the mixing device 210 interfaces or is part of another system, such as the echo-cancellation system, the post-processing device 240 may represent a pre-processor or post-processor, and the level of attenuation may be programmed or configured to desired ranges, such as about 3 dB to about 12 dB.

In some systems, the post-processor 240 may comprise a multi-channel Wiener filter. In systems where the filter comprises the only noise reducing element, an exemplary noise attenuation level may programmed within a range of about 10 dB to about 40 dB when processing more than 2 channels.

The spectral coherence or "magnitude squared coherence" (MSC) provided by the coherence calculating device 410 may range from about 0 to about 1, and may vary relative to the distance between the inputs 120. The MSC value may fall off when the signal-to-noise ratio at a bin is very low. There may be situations where the measured coherence at some frequencies is low due to reflections and input housing characteristics. Thus, the spectral coherence may be post-processed. In these and other systems, the systems first smooth the coherence across frequencies.

The coherence signal smoothing device 420 may smooth the coherence across all or selected frequency ranges. The device 420 may apply a "bidirectional" IIR process to smooth the coherence values across frequencies. An asymmetric IIR may bias the smoothed result to favor higher values according to Equation 17:

$$C'_{xy_i}=C'_{xy_i}+\alpha(C_{xy_i}-C_{xy_i}) \quad \text{(Equation 17)}$$

In Equation 17 $\alpha$ may be set to a high value, such as about 1.0, when coherence may be increasing from bin to bin. The value of $\alpha$ may be set to a low value, such as about 0.1, when coherence may be decreasing from bin to bin. This process may provide a form of spectral envelope that may compensate for poor coherence at a frequency.

The IIR processing may be bidirectional because the smoothing may be applied first across increasing frequency bins, and then across decreasing frequency bins, to generate an envelope that varies smoothly in a symmetric manner around any one spectral peak. Smoothing may achieve a coherence measure for given formants.

Because speech formants may be narrower at lower frequencies than at higher frequencies, the value of $\alpha$ may vary with frequency. Because the value of a may be programmed to about 1 for rising coherences, $\alpha$ may vary across frequency only for falling coherences. To capture the variation in formant width, the value of a may be set to a higher value in lower frequencies than at higher frequencies. This may capture the coherence of formants, and may allow for sensitive detection of neighboring harmonics around a single, higher signal-to-noise ratio harmonic in noise.

In some systems the coherence in the valleys or dips between harmonics, which may contain noise, may be overestimated. To correct such overestimates, the coherence edge enhancement device 430 may attenuate the frequency smoothed spectral coherence where there are dips detected in the raw coherence. The smoothed coherence ($\overline{C}_{xy_i}$) may be suppressed when a valley is detected in the raw coherence, and may not be suppressed where peaks are found. A low complexity representation of this process may be expressed as Equation 18:

$$\overline{C}'_{xy_i} = \overline{C}_{xy_i} - \text{MAX}\left\{0, \frac{C_{xy_{i-1}} + C_{xy_{i+1}}}{2}\right\} \quad \text{(Equation 18)}$$

Noise may be coherent depending on how fast the power spectral density and the cross spectral density IIR filters are updated, and may depend on the distance between the inputs 120 and their directionality. To account for the long term maximum and long term minimum coherence, the coherence tracking device 440 may determine a normalized coherence.

A spectrally smoothed coherence may be normalized by temporally averaging the smoothed coherence using an asymmetric IIR filter or process. The maximum long term coherence may be tracked by an IIR filter given by Equation 19:

$$C\max'_{xy_i}=C\max'_{xy_i}+\alpha(\overline{C}'_{xy_i}-C\max'_{xy_i}) \quad \text{(Equation 19)}$$

In Equation 19 $\alpha$ may be programmed to a high value of about 0.1 when coherence is increasing from one frame to another, and may be programmed to a low value of about 0.001 when coherence is decreasing from one frame to another. Equation 19 may represent a peak-and-hold process that may provide an estimate of the best coherence at any one frequency bin.

The minimum coherence may be tracked in time by approximately reversing the $\alpha$ value as expressed in Equation 20:

$$C\min'_{xy_i}=C\min'_{xy_i}+\alpha(\overline{C}'_{xy_i}-C\min'_{xy_i}) \quad \text{(Equation 20)}$$

In Equation 20, $\alpha$ may be programmed to a high value of about 0.1 when coherence is decreasing from one frame to another, and may be programmed to a low value of about 0.001 when coherence is increasing from one frame to another. The estimate may provide an accurate estimate of the coherence of the noise at one or more frequency bins. Due to variation of some inputs and the effects of wind (which may be incoherent), coherence maximums and minimums lower than about 450 Hz may be increased so that the normalized coherence is more robust.

A normalized coherence may be programmed by subtracting the minimum coherence from the smoothed coherence and dividing by the difference between the maximum and minimum coherence at that particular bin as shown in Equation 21:

$$Cnorm_{xy_i} = \frac{(\overline{C}'_{xy_i} - Cmin'_{xy_i})}{(Cmax'_{xy_i} - Cmin'_{xy_i})} \quad \text{(Equation 21)}$$

where the smoothed coherence below the minimum may be negative, and the smoothed coherence above the maximum may be greater than about 1. The value of $Cnorm_{xy_i}$ may be clamped to between about 0 and about 1.

The mixing device 210 and the post-processing device 240 may enhance a signal that has a good signal-to-noise ratio and is coherent. Signals may be present that have a good signal-to-noise ratio, but may not have good coherence levels, because wind may be affecting one input. Similarly, signals may be present that may have poor signal-to-noise ratios, but which may exhibit good coherence levels. The mixing system 106 may enhance a signal having a low signal-to-noise ratio that nevertheless has good coherence, but may not unnecessarily attenuate a signal having a good signal-to-noise ratio.

The coherence over-estimation device 450 or process may account for these conditions. A threshold value corresponding to a good signal-to-noise ratio may be programmed to a predetermined value, for example about 12 dB or about four times the magnitude. The coherence level in bins having a signal-to-noise ratio above the threshold value may be over-estimated to the extent that the signal-to-noise ratio exceeds four times the magnitude. For example, if a harmonic at about 1000 Hz has a signal-to-noise ratio of about 18 dB (8×), the over-estimation factor (β) may be given by Equation 22:

$$\beta = \frac{SNR}{4} \quad \text{(Equation 22)}$$

The value of the over-estimation factor (β) may be clamped to between about 1 and a maximum allowable over-estimation factor of about 4×. The smoothed and normalized coherence may be over-estimated based on Equation 23:

$$Cscaled_{xy_i} = \beta \times Cnorm_{xy_i}, \quad \text{(Equation 23)}$$

where the result may be clamped to between about 0 and about 1. Thus, the exemplary coherence of a signal having a signal-to-noise ratio of about 18 dB may be over-estimated by a factor of about 8/4, or about twice its estimated value.

If coherence is very low, such as between about 0 and about 0.1, then multiplying by a factor of two (2×) may result in a significant attenuation. However, if the coherence is about 0.5, then its associated higher signal-to-noise ratio may prevent excess attenuation. If the signal-to-noise ratio is very low, such as about 6 dB, which may represent the edge of the noise, a high coherence may leave the value untouched while suppressing the noise around it by about 6 dB, which may provide an apparent 12 dB signal-to-noise ratio to a downstream noise suppressor or noise suppression process. Thus, the mixing system 106 may enhance a highly coherent signal that stands above the background of incoherent and coherent noise, but that nevertheless may have a low signal-to-noise ratio.

The coherence-based attenuation device 460 may use the scaled, smoothed, and normalized coherence to apply an attenuation factor. The attenuation factor may be applied to the mixed output $M\,Re'_i$ and $M\,Im'_i$. The attenuation level may be a smooth function of the coherence based on Equation 24:

$$Atten = (1 - \chi^2);\ 0 <= \chi <= b, \quad \text{(Equation 24)}$$

where χ is based on Equation 25:

$$x = \frac{Cmax - Cscaled_{xy_i}}{Cmax - Cmin} \quad \text{(Equation 25)}$$

The value of b may be based on Equation 26:

$$b = \sqrt{1 - Catten}, \quad \text{(Equation 26)}$$

In Equations 25 and 26, C max may range from about 0.8 to about 1 (for example, about 1), C min may range from about 0 to about 0.7 (for example, about 0.3), and Catten may range from about 0.707 (−3 dB) to about 0.25 (−12 dB) (for example about 0.5 or −6 dB).

The attenuation asymptotes at about 1 where coherence has a value equal to about Cmax, and may fall off smoothly to a value of Catten when coherence has a value equal to about Cmin. The final attenuation to the complex mixed values may be based on Equations 27-28:

$$M'Re_i = M\,Re_i \times Atten \quad \text{(Equation 27)}$$

$$M'Im_i = M\,Im_i \times Atten \quad \text{(Equation 28)}$$

The logic, devices, circuitry, and processing described above may be encoded in a computer-readable medium such as a CDROM, disk, flash memory, RAM or ROM, an electromagnetic signal, or other machine-readable medium as instructions for execution by a processor. Alternatively or additionally, the logic may be implemented as analog or digital logic using hardware, such as one or more integrated circuits (including amplifiers, adders, delays, and filters), or one or more processors executing amplification, adding, delaying, and/or filtering instructions; or in software in an application programming interface (API) or in a Dynamic Link Library (DLL), functions available in a shared memory or defined as local or remote procedure calls; or as a combination of hardware and software.

The logic may be represented in (e.g., stored on or in) a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory “RAM,” a Read-Only Memory “ROM,” an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A noise reduction system comprising:

a signal mixing device configured to:

mix input signals according to a mixing ratio; and constructively add the input signals to generate an output, where the mixing ratio is based on a magnitude and a signal-to-noise ratio of the input signals, and where the input signals comprise a first input signal and a second input signal, and where the signal mixing device is further configured to rotate the first input signal in phase with the second input signal to mix the input signals.

2. The noise reduction system of claim 1 further comprising a plurality of transducers that convert the input signals into analog or digital signals.

3. The noise reduction system of claim 1 where the signal mixing device comprises a comparator that compares the magnitude of the input signals to a noise estimate.

4. The noise reduction system of claim 1 where the signal mixing device is further configured to estimate phase differences between the input signals.

5. The noise reduction system of claim 1 where the mixing ratio comprises a ratio based on attributes of the input signals.

6. The noise reduction system of claim 5 where the mixing ratio is a time smoothed ratio.

7. The noise reduction system of claim 6 where the time smoothed ratio is a variable ratio that varies with the attributes of the input signals.

8. The noise reduction system of claim 6 further comprising a wind buffet detection device configured to identify noises associated with wind flow.

9. The noise reduction system of claim 8 further comprising a wind buffet suppression device configured to dampen the identified noises associated with wind flow.

10. The noise reduction system of claim 1 where the signal mixing device comprises an echo cancellation system.

11. The noise reduction system of claim 1 where the signal mixing device interfaces a vehicle.

12. The noise reduction system of claim 1 where the magnitude is an approximated magnitude and the signal-to-noise ratio is an estimated signal-to-noise ratio.

13. The noise reduction system of claim 1 where the signal mixing device is configured to rotate the first input signal in phase with the second input signal on a frame-by-frame basis.

14. The noise reduction system of claim 1 where the first input signal has a lower amplitude than an amplitude of the second input signal.

15. The noise reduction system of claim 1 where the signal mixing device is configured to rotate the first input signal in phase with the second input signal independently at each frequency or frequency bin.

16. A noise reduction system, comprising:

means to mix a plurality of input signals according to a mixing ratio, where the means to mix constructively adds the plurality of input signals in response to the mixing ratio to generate an output, where the mixing ratio is based on a magnitude and a signal-to-noise ratio of the signals, and where the input signals comprise a first input a second input signal, and where the means to mix rotates the first input signal in phase with the second input signal to mix the input signals.

17. The noise reduction system of claim 16 where the means to mix further estimates phase differences between the plurality of input signals.

18. The noise reduction system of claim 16 where the mixing ratio comprises a ratio based on attributes of the input signals.

19. The noise reduction system of claim 18 where the mixing ratio is a time smoothed ratio.

20. The noise reduction system of claim 19 where the time smoothed ratio is a variable ratio.

21. The noise reduction system of claim 19 further comprising a wind buffet detection device configured to identify noises associated with wind flow.

22. The noise reduction system of claim 21 further comprising a wind buffet suppression device configured to dampen the identified noises associated with wind flow.

23. The noise reduction system of claim 16, where the magnitude is an approximated magnitude and the signal-to-noise ratio is an estimated signal-to-noise ratio.

24. The noise reduction system of claim 16 where the means to mix rotates the first input signal in phase with the second input signal on a frame-by-frame basis.

25. The noise reduction system of claim 16 where the first input signal has a lower amplitude than an amplitude of the second input signal.

26. The noise reduction system of claim 16 where the means to mix rotates the first input signal in phase with the second input signal independently at each frequency or frequency bin.

* * * * *